US008332204B2

(12) United States Patent
Watanabe (10) Patent No.: US 8,332,204 B2
(45) Date of Patent: Dec. 11, 2012

(54) INSTRUCTION CHECK PROGRAM, INSTRUCTION CHECK APPARATUS, AND I/O SIMULATOR

(75) Inventor: Manabu Watanabe, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 779 days.

(21) Appl. No.: 12/343,767

(22) Filed: Dec. 24, 2008

(65) Prior Publication Data

US 2009/0171648 A1    Jul. 2, 2009

(30) Foreign Application Priority Data

Dec. 26, 2007    (JP) ................. 2007-335160

(51) Int. Cl.
*G06F 9/455* (2006.01)

(52) U.S. Cl. .......... 703/25; 703/6; 703/15; 703/16; 703/21; 714/43; 714/37; 714/33; 710/23

(58) Field of Classification Search .......... 703/13, 703/27, 20, 24, 17, 25, 14; 714/743; 710/23
See application file for complete search history.

(56) References Cited

U.S. PATENT DOCUMENTS

| | | | | |
|---|---|---|---|---|
| 5,088,033 | A | * | 2/1992 | Binkley et al. ................. 703/24 |
| 5,129,064 | A | * | 7/1992 | Fogg et al. ................... 703/25 |
| 6,980,944 | B1 | * | 12/2005 | Oshins et al. ................. 703/17 |
| 2002/0158661 | A1 | * | 10/2002 | Libov et al. ................... 326/39 |
| 2003/0023791 | A1 | * | 1/2003 | Suzuki et al. ................. 710/62 |
| 2003/0033131 | A1 | * | 2/2003 | Ito ............................ 703/20 |
| 2003/0229486 | A1 | * | 12/2003 | Ito ............................ 703/27 |
| 2004/0102944 | A1 | * | 5/2004 | Shortz ......................... 703/14 |
| 2004/0260993 | A1 | * | 12/2004 | Griffin et al. ................. 714/743 |
| 2005/0131664 | A1 | * | 6/2005 | Chen et al. ................... 703/13 |

FOREIGN PATENT DOCUMENTS

| | | |
|---|---|---|
| JP | 2000-276502 | 10/2000 |
| JP | 2001-202272 | 7/2001 |
| JP | 2004-220089 | 8/2004 |

OTHER PUBLICATIONS

Craig B. Stunkel, W. Kent Fuchs Trapeds: Producing Traces for Multicomputers Via Execution Driven Simulation ACM 0-89791-315-9/89/0005/0070 1989, pp. 70-78.*

* cited by examiner

*Primary Examiner* — Kamini S Shah
*Assistant Examiner* — Cuong Luu
(74) *Attorney, Agent, or Firm* — Staas & Halsey LLP (57) ABSTRACT

A computer-readable medium encoded with an instruction check program for making a computer to check a status of execution of an instruction by an I/O simulator that performs an operation simulation according to a structure of an I/O area of a microcomputer, the instruction check program when executed by a computer causes the computer to perform a method including obtaining specification information of the microcomputer describing an input and an output condition of a hardware resource in the I/O area, detecting a simulation of a reference instruction to the hardware resource executed by the I/O simulator, determining correctness of the reference instruction by comparing a content of the simulation of the reference instruction detected by the detecting with the input and output condition of the hardware resource included in the obtained specification information, and outputting an error signal when it is determined that the reference instruction is incorrect.

9 Claims, 11 Drawing Sheets

```
0x10088   func:
      8         LINK      #0
      A         MOVN      A, #3
      B         MOVW      LI_1, A
      D         MOV  A,   I:_IO_DDR1      ~901
      F         MOVW      @RW+-2  A
      2         UNLINK
      3         RET
              . END
```

| ERROR NO. | I/O RESOURCE | I/O REGISTER | I/O BIT | ERROR MESSAGE OUTPUT CONDITION |
|---|---|---|---|---|
| E4001K | CLOCK | PSCCR | RESERVED BIT | WHEN "1" IS SET TO RESERVED BIT |
| | 8/10-BIT A/D CONVERTER | ADCS | RESERVED BIT | |
| | CAN CONTROLLER | CSR | RESERVED BIT | |
| | ADDRESS COINCIDENCE DETECTION FUNCTION | PACSR0, PACSR1 | RESERVED BIT | |
| | TIME-BASE TIMER | TBTC | RESERVED BIT | WHEN "0" IS SET TO RESERVED BIT |
| | 8/16-BIT PPG TIMER | PPGCn, PPGCm | RESERVED BIT | |
| E4002K | 8/16-BIT PPG TIMER | PPGnm | PCM0-PCM2 | WHEN "5" OR "6" IS SET TO PCM0-PCM2 BITS |
| | | PPGnm | PCS0-PCS2 | WHEN "5" OR "6" IS SET TO PCS0-PCS2 BITS |
| | | PPGCn, PPGCm | MD0-MD1 | WHEN "2" IS SET TO MD0-MD1 BITS |
| | CAN CONTROLLER | DLCR | DLC0-DLC3 | WHEN VALUE OUTSIDE RANGE OF "0-8" IS SET TO DLC0-DCL3 BITS |
| | | CANSWR | UNUSED BIT | WHEN "1" IS SET TO UNUSED BIT |
| | CLOCK | CKSCR, PSCCR | CS0-CS2 | WHEN "7" IS SET TO CS0-CS2 BITS |
| E4021K | RELOAD TIMER | TMCSR | CSL0-CSL1 | WHEN "3" IS SET TO CSL0-CSL1 BITS |
| | | TMCSR | MOD0-MOD2 | WHEN "1-7" ARE SET TO MOD0-MOD2 BITS |
| | 16-BIT INPUT/OUTPUT TIMER | TCCS | ECKE | WHEN "1" IS SET TO ECKE BIT |
| | | ICE | ICUSn | WHEN "1" IS SET TO ICUSn BIT, WHEN "2-4" ARE SET TO ICUS60-ICUS61 BITS |
| | | ICE | ICUSm | WHEN "1" IS SET TO ICUS1 BIT, WHEN "1" IS SET TO ICUS7 BIT |

INSTRUCTION CHECK PROGRAM, INSTRUCTION CHECK APPARATUS, AND I/O SIMULATOR

CROSS-REFERENCE TO RELATED APPLICATIONS

This application is based upon and claims the benefit of priority from the prior Japanese Patent Application No. 2007-335160 filed on Dec. 26, 2007, the entire contents of which are incorporated herein by reference.

BACKGROUND

1. Field

This invention relates to an instruction check program, an instruction check apparatus, and an I/O simulator that perform an operation simulation of a microcomputer including a processor core and an input and output function section (hereinafter, referred to as "I/O area") for controlling peripheral circuits by a control signal outputted from the processor core.

2. Description of Related Art

Conventionally, when a microcomputer, such as a CPU (central processing unit) or a DSP (digital signal processor), is incorporated in an apparatus and a piece of software desired by the user is executed, an operation verification using a simulator is performed before the microcomputer is mounted. When a bug occurs in the execution of the software by this operation verification, a debugging processing is performed to correct the part of the bug.

The debugging processing includes hardware debugging for correcting a defect of the hardware itself of the processor and software debugging for correcting a defect of the software executed by the processor. An example of a software debugging system is a method using a CPU and storage means for debugging.

In Japanese Laid-Open Patent Application No. 2004-220089, it is described that the CPU's access to a storage area where the storage means is disposed is verified by the software debugging.

SUMMARY

Various embodiments of the present invention provide a computer-readable medium encoded with an instruction check program for making a computer to check a status of execution of an instruction by an I/O simulator that performs an operation simulation according to a structure of an I/O area of a microcomputer, the instruction check program when executed by a computer causes the computer to perform a method including obtaining specification information of the microcomputer describing an input and an output condition of a hardware resource in the I/O area, detecting a simulation of a reference instruction to the hardware resource executed by the I/O simulator, determining correctness of the reference instruction by comparing a content of the simulation of the reference instruction detected by the detecting with the input and output condition of the hardware resource included in the obtained specification information, and outputting an error signal when it is determined that the reference instruction is incorrect.

Various embodiments of the present invention provide an instruction check apparatus that checks a status of execution of an instruction by an I/O simulator that performs an operation simulation according to a structure of an I/O area of a microcomputer, the apparatus including a unit obtaining specification information of the microcomputer describing an input and an output condition of a hardware resource in the I/O area, a unit detecting a simulation of a reference instruction to the hardware resource executed by the I/O simulator, a unit determining correctness of the reference instruction by comparing a content of the simulation of the reference instruction detected by the detecting unit with the input and output condition of the hardware resource included in the specification information obtained by the obtaining unit, and a unit outputting an error signal when the determining unit determines that the reference instruction is incorrect

DESCRIPTION OF THE PREFERRED EMBODIMENTS

With reference to the attached drawings, various embodiments of the instruction check program, the instruction check apparatus, and the I/O simulator will be described in detail.

Figure 1:
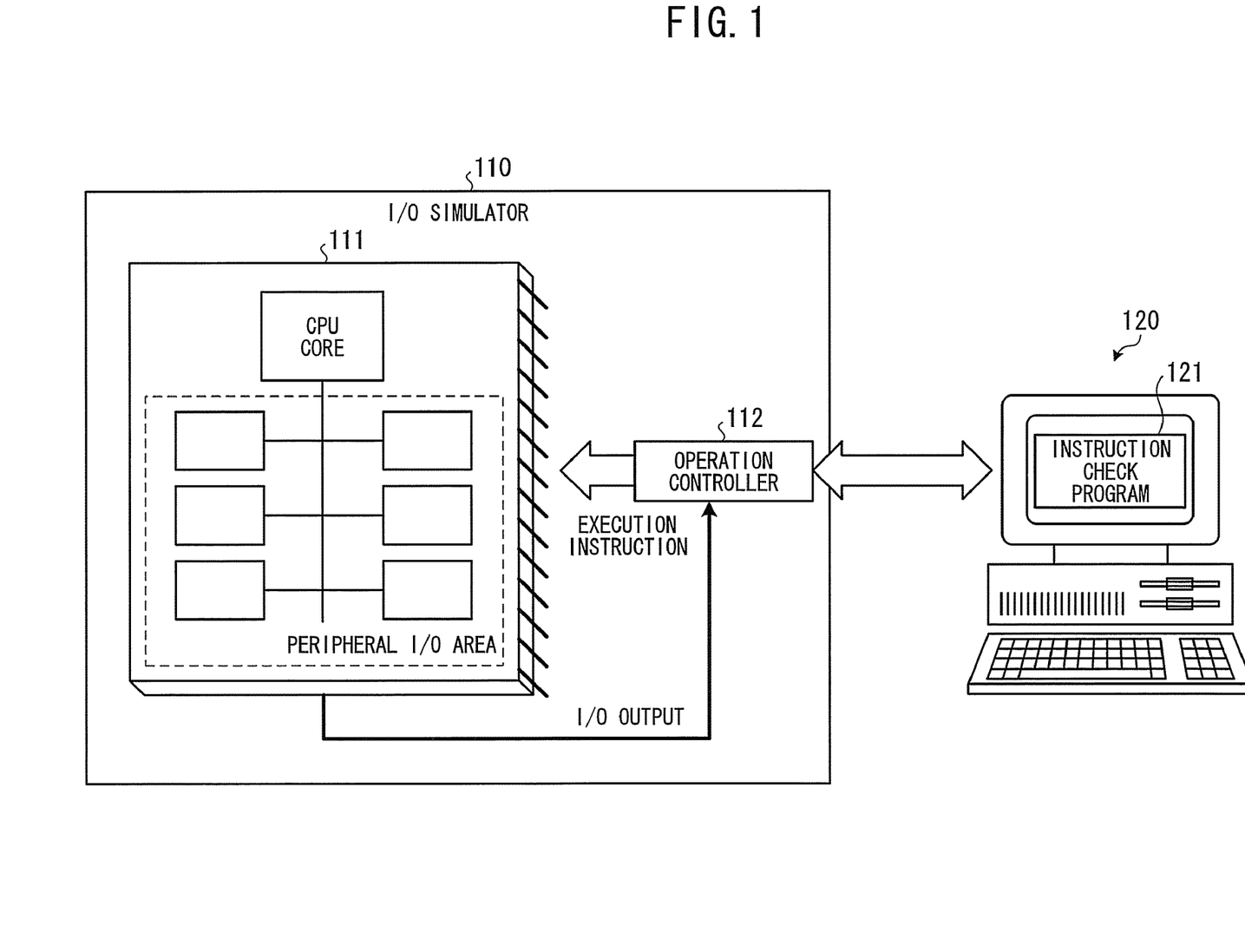
FIG. 1 is an explanatory view showing the general outline of instruction check processing according to an embodiment.

First, a general outline of the instruction check processing according to the present embodiment will be described. FIG. 1 is an explanatory view showing the general outline of the instruction check processing according to the present embodiment. As in FIG. 1, according to the present embodiment, an operation verification of a microcomputer 111 is performed by an I/O simulator 110. The I/O simulator 110 is capable of performing a simulation considering the CPU core of the microcomputer 111 and the input and output of hardware resources disposed in a peripheral I/O area.

The I/O simulator 110 has an operation controller 112 as a manager function section that controls the input and output of the microcomputer 111. An execution instruction to be simulated by the microcomputer 111 is inputted from the operation controller 112. The I/O output that is the result of execution of the execution instruction inputted from the operation controller 112 is outputted to the operation controller 112. In this way, the I/O simulator 110 can perform a simulation considering the peripheral I/O area of the microcomputer 111.

The simulation executed by the I/O simulator 110 as described above may be one considering all the structures of the CPU core of the microcomputer 111 and the hardware resources in the peripheral I/O area. Alternatively, the simulation may be one considering the I/O of a specific hardware resource of the hardware resources. While a specific structure example of the hardware resources disposed in the peripheral I/O area of the microcomputer 111 differs according to the design contents of the microcomputer, for example, various timers, I/O ports, and an AD converter are disposed.

Further, in the case of the present embodiment, when the simulation of the microcomputer 111 by the I/O simulator 110 is executed, an instruction check program 121 stored in an instruction check apparatus 120 is started at the same time. The instruction check program 121 has the function of checking the execution status of the instruction executed by the I/O simulator 110. In particular, the instruction check program 121 checks the reference instruction executed by the microcomputer 111 to verify whether or not incorrect processing is performed.

The referent and timing at the time of the execution of the reference instruction at the microcomputer 111 is preset by the specification information of the microcomputer 111. Therefore, the incorrect processing indicates a case where the microcomputer 111 refers to an incorrect hardware resource and a case where the microcomputer 111 refers to a hardware resource at incorrect timing. As described above, by notifying a compiler or an assembler of a correct instruction sequence by checking the incorrect processing by the instruction check program 121, the instruction sequence can be converted to one by which correct hardware access can be made at the next compilation.

Figure 2:
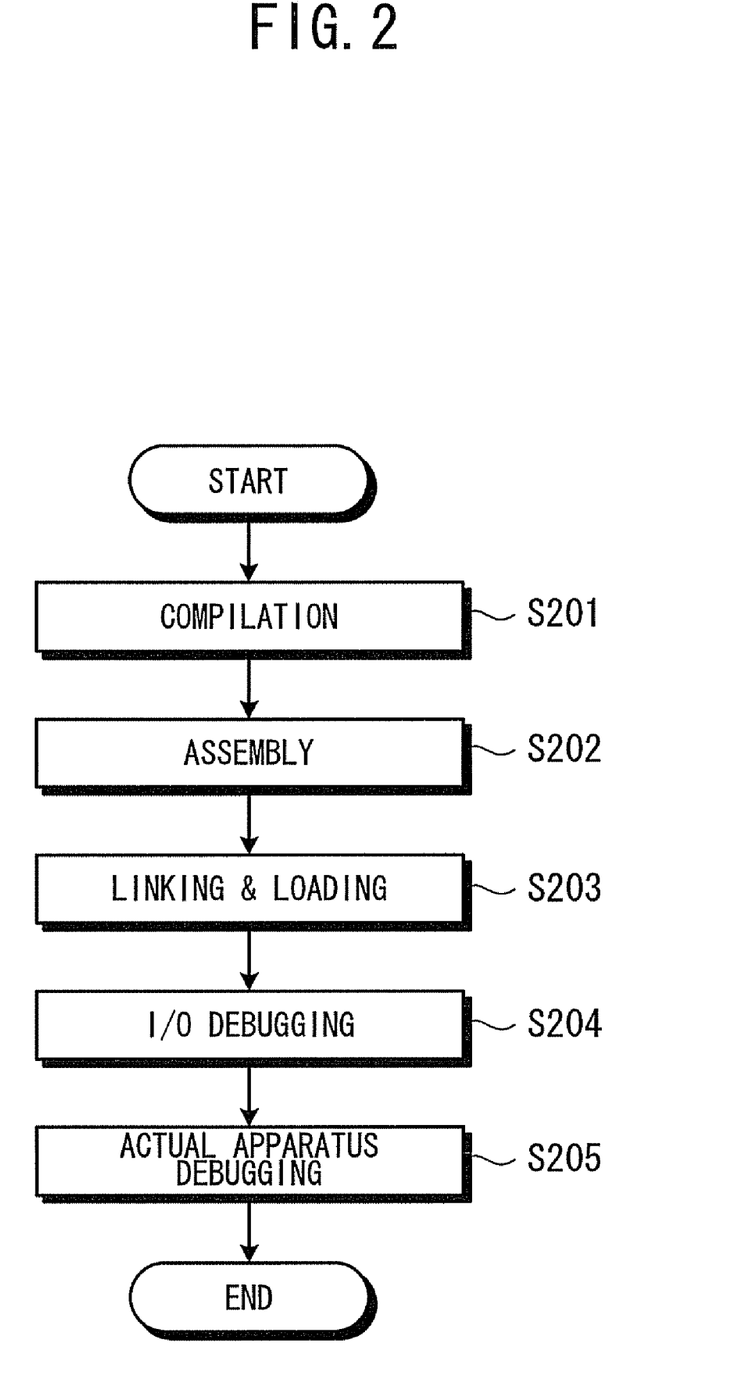
FIG. 2 is a flowchart showing the procedure of debugging processing using instruction check processing.

FIG. 2 is a flowchart showing the procedure of debugging processing using the instruction check processing. Using FIG. 2, the processing up to the mounting of the microcomputer 111 on an actual apparatus will be described. Like the flowchart of FIG. 2, to execute a user-desired application by the microcomputer 111, first, on the application, compilation (step S201), assembly (step S202), and further, linking and loading (step S203) are performed.

Thereafter, a simulation is performed by the I/O simulator 110, whereby it can be verified whether or not incorrect processing is performed by the reference instruction as described above. By this verification, I/O debugging as described above is performed (step S204), and actual apparatus debugging is performed thereafter (step S205), so that the microcomputer 111 becomes practically usable. As described above, I/O debugging can be efficiently performed by executing the instruction check processing of the present embodiment.

While the instruction check program is executed by the instruction check apparatus 120 independent of the I/O simulator 110 in FIG. 1, a function equivalent to the instruction check apparatus 120 may be provided in the I/O simulator 110. In this case, the I/O simulator 110 is one that is provided with the instruction check program 121. The present embodiment will be described on the assumption that the I/O simulator 110 and the instruction check apparatus 120 are independent of each other. Therefore, the functional structure of the instruction check apparatus 120 and the procedure of the instruction check processing when the instruction check program 121 is executed by the instruction check apparatus 120 will be described as follows.

Figure 3:
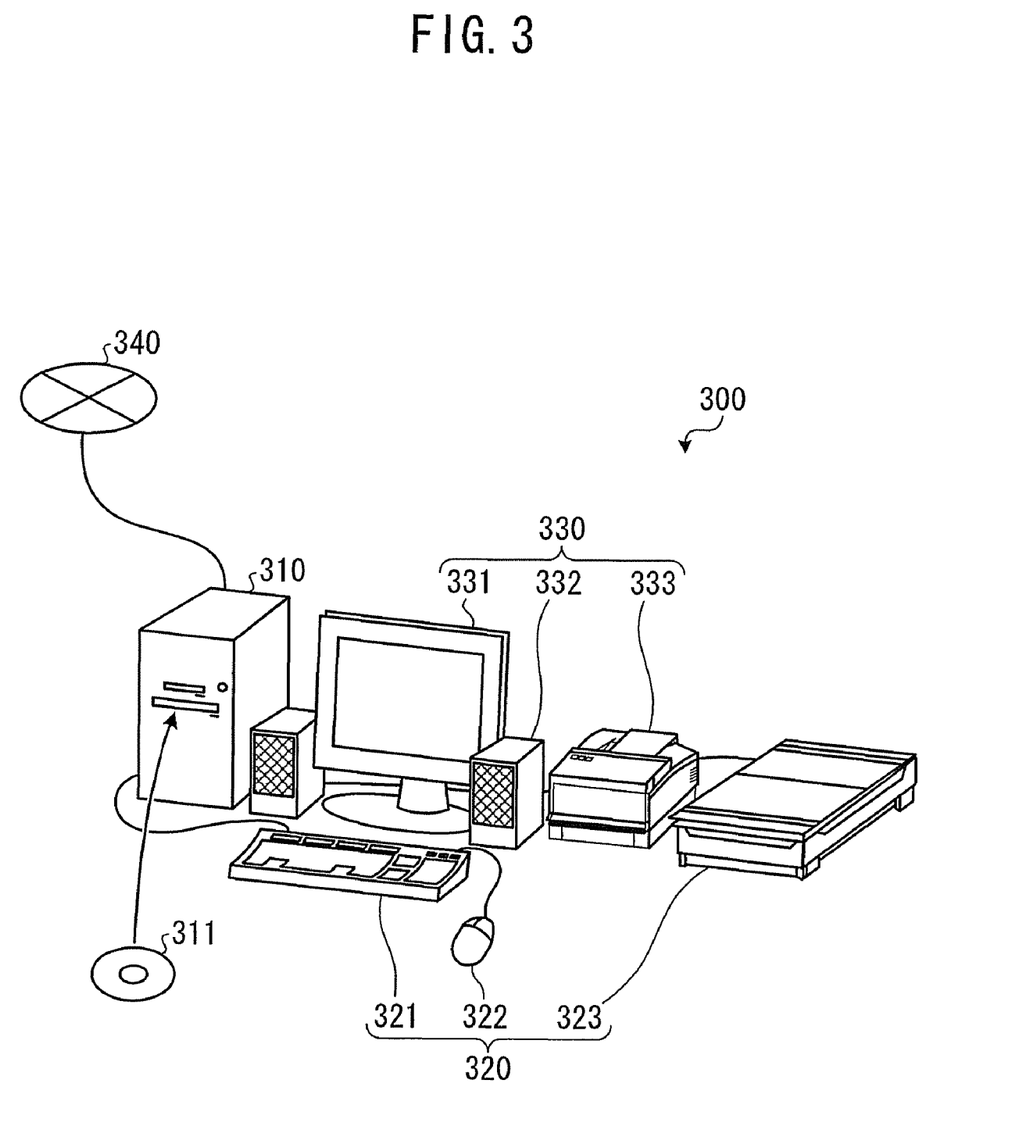
FIG. 3 is an explanatory view showing the hardware structure of an instruction check apparatus that executes an instruction check program.

First, the hardware structure of the instruction check apparatus 120 that executes, in the present embodiment, the instruction check program according to the present embodiment will be described. FIG. 3 is an explanatory view showing the hardware structure of the instruction check apparatus that executes the instruction check program.

In FIG. 3, the instruction check apparatus 120 includes a computer main unit 310, input devices 320, and output devices 330, and is connectable to a network 340 such as a LAN, a WAN, or the Internet through a non-illustrated router or modem.

The computer main unit 310 includes a CPU, a storage area, and an interface. The CPU controls the entire I/O simulator 110. The storage area includes a ROM, a RAM, an HD, an optical disk 311, and a flash memory. The storage area is used as the work area of the CPU.

Various programs are stored in the storage area and loaded in response to an instruction from the CPU. The reading and writing of data from and to the HD and the optical disk 311 are controlled by the disk drive. The optical disk 311 and the flash memory are detachably attachable to the computer main unit 310. The interface controls the input from the input devices 320, the output to the output devices 330, and transmission and reception to and from the network 340.

Examples of the input devices 320 include a keyboard 321, a mouse 322, and a scanner 323. The keyboard 321 has keys for inputting characters, numbers, and various instructions, and performs data input. The keyboard 321 may be a touch panel type. The mouse 322 performs cursor movement, range selection, window movement, window size change, and the like. The scanner 323 optically reads images. The read images are captured as image data and stored in the storage area of the computer main unit 310. The scanner 323 may be provided with an OCR function.

Examples of the output devices 330 include a display 331, a speaker 332, and a printer 333. The display 331 displays data such as a cursor, an icon, a toolbox, a document, an image, and functional information. The speaker 332 outputs sounds such as a sound effect and a reading voice. The printer 333 prints image data and document data.

An instruction check processor is structured as a functional structure that checks the instruction being executed by the I/O simulator 110 by executing the instruction check program 121 by the instruction check apparatus 120 having the above-described hardware structure. Therefore, the functional structure of the instruction check processing structured in the instruction check apparatus 120 will be described next.

Figure 4:
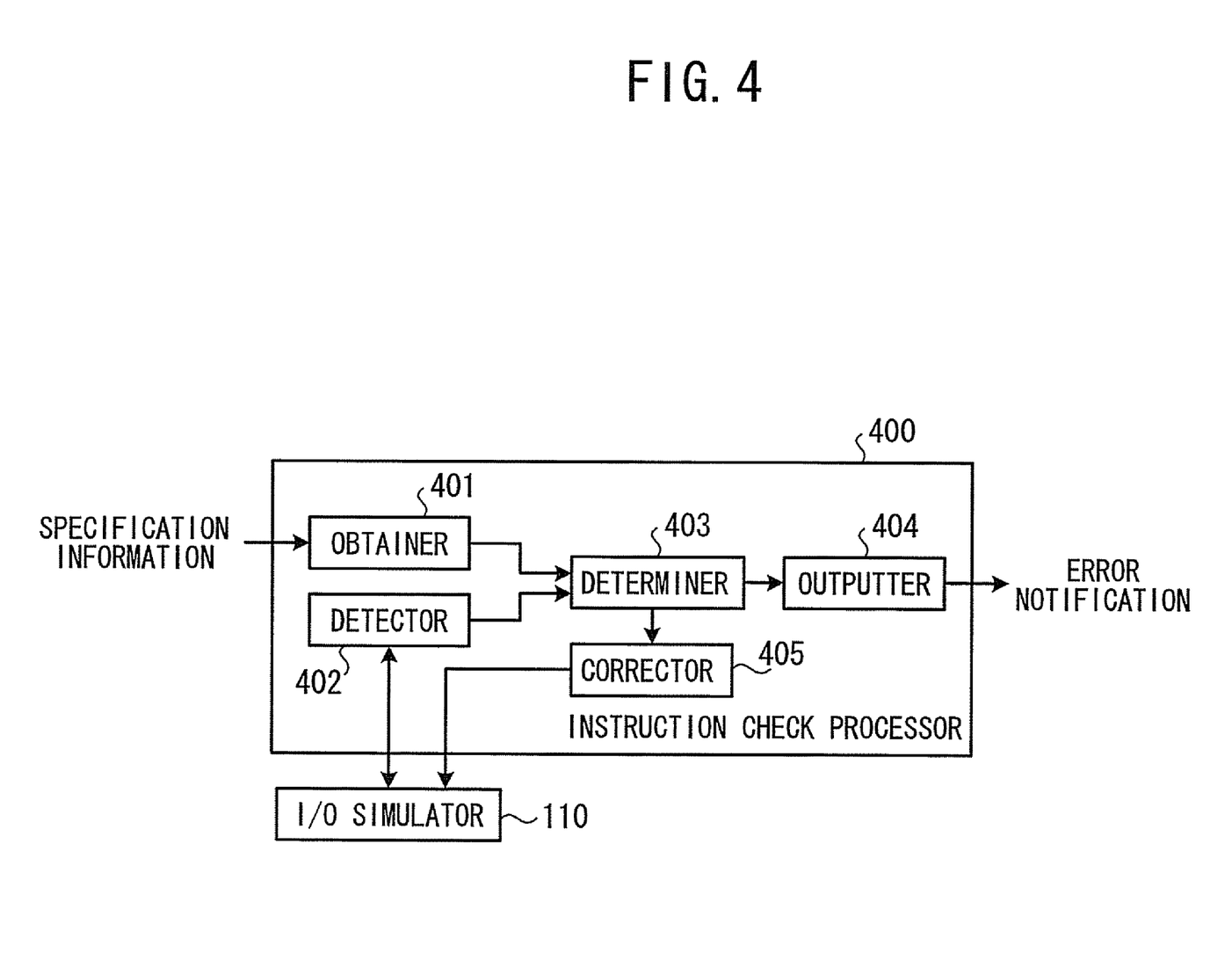
FIG. 4 is a block diagram showing the functional structure of an instruction check processor.

FIG. 4 is a block diagram showing the functional structure of the instruction check processor. In FIG. 4, the instruction check processor 400 of the I/O simulator 110 includes an obtainer 401, a detector 402, a determiner 403, an outputter 404, and a corrector 405.

First, the obtainer 401 obtains the specification information describing the input and the output conditions of the hardware resources in the peripheral I/O area of the microcomputer 111. Since the I/O simulator 110 generally obtains the specification information of the object of the simulation (in this example, the microcomputer 111) to construct the simulation, the obtainer 401 may obtain the specification information held by the I/O simulator 110 or obtain the specification information externally.

The detector 402 detects the simulation of the reference instruction to the hardware resource executed by the I/O simulator 110. As described above, in the I/O simulator 110, various instructions are executed to perform a simulation corresponding to the function and structural contents of the microcomputer 111. The detector 402 detects the execution of, among the instructions executed at the microcomputer 111, the reference instruction.

The determiner 403 determines the correctness of the reference instruction by comparing the contents of the simulation related to the reference instruction detected by the detector 402 with the input and output condition of the hardware resource contained in the specification information obtained by the obtainer 401. The reference instruction is regarded as correct when the execution status at the microcomputer 111 coincides with the setting of the input and output condition described in the specification information. When the execution status does not coincide with the setting of the input and output condition, the reference instruction is incorrect and regarded as incorrect processing.

The input and output condition of the hardware resource is, specifically, the address setting to be referred to and the access timing. Therefore, the determiner 403 determines that the reference instruction is correct when the address of the hardware resource referred to in the reference instruction by the I/O simulator 110 coincides with the address described in the input and output condition of the hardware resource.

If the address of the hardware resource referred to by the reference instruction as described above coincides with the address described in the input and output condition of the hardware resource, the determiner 403 may determine that the reference instruction is correct when the timing of access to the hardware resource coincides with the input and output condition.

The outputter 404 outputs an error signal when the determiner 403 determines that the reference instruction is incorrect. Any of the output devices 330 described with reference to FIG. 3 may be used for outputting the error signal, or the user may arbitrarily set which to use. As an example of the error signal output, the outputter 404 may output an error message providing notification that reference is made to an incorrect hardware resource when the determiner 403 determines that the reference instruction is incorrect. Likewise, the outputter 404 may output an error message providing notification that the timing of access to the hardware resource is incorrect when the determiner 403 determines that the reference instruction is incorrect.

The corrector 405 inserts, into the reference instruction, a correction code for reference to a correct hardware resource to be made when the determiner 403 determines that the reference instruction is incorrect. By the insertion of the correction code by the corrector 405, the instruction sequence can be corrected to one by which correct hardware access is made at the next compilation. Whether to output the error signal by the outputter 404 or to correct the instruction by the corrector 405 when incorrect processing was performed may be arbitrarily set by the user.

Figure 5:
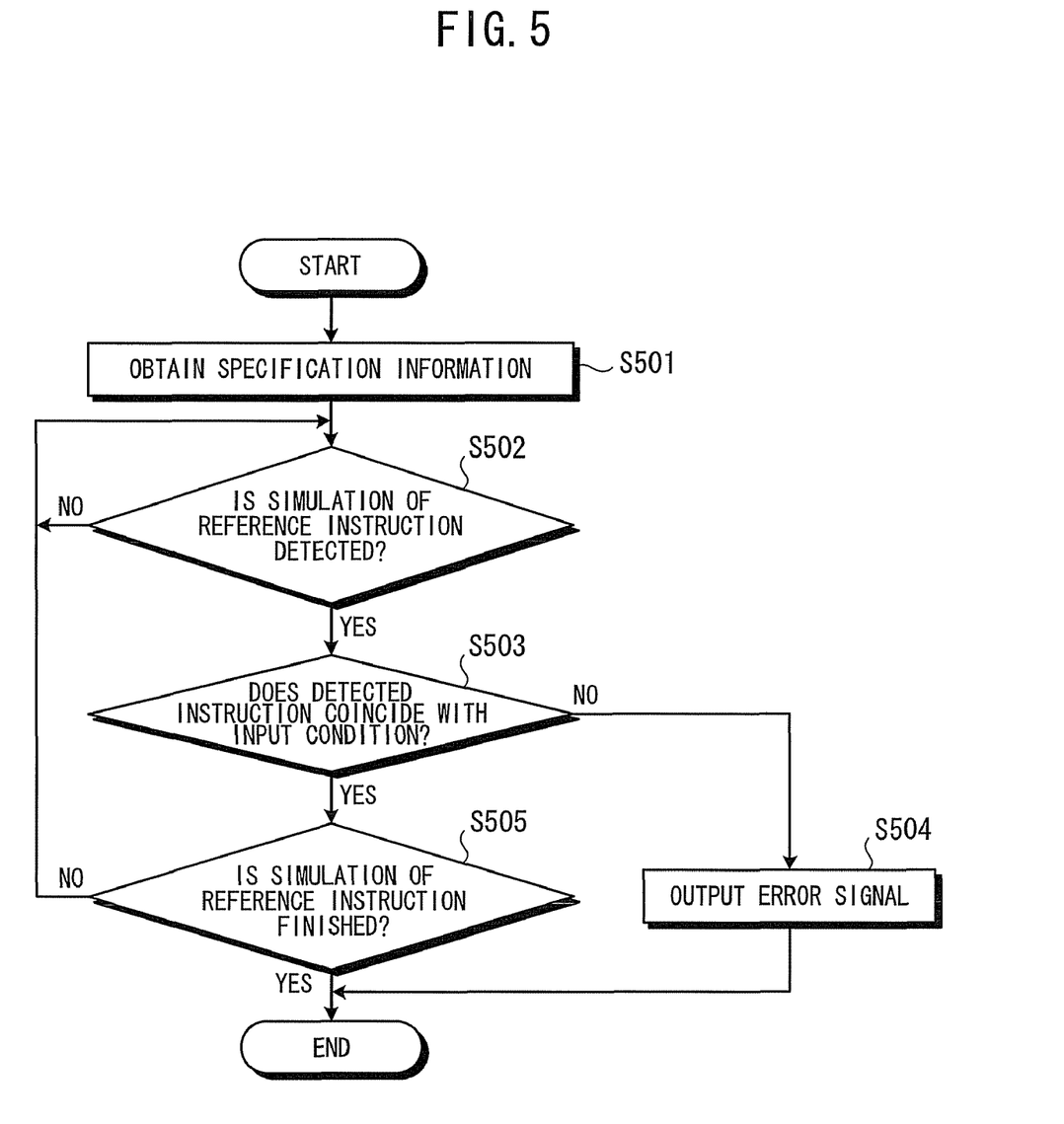
FIG. 5 is a flowchart showing the execution procedure of the instruction check processing.

Next, the execution procedure of the instruction check processing will be described. FIG. 5 is a flowchart showing the execution procedure of the instruction check processing. In the flowchart of FIG. 5, first, the obtainer 401 obtains the specification information of the microcomputer 111 (step S501). Then, the detector 402 determines whether the simulation of the reference instruction is detected from the simulation executed by the I/O simulator 110 or not (step S502).

At step S502, the process waits until the simulation of the reference instruction is detected (step S502: loop of No), and, when the simulation of the reference instruction is detected (step S502: Yes), the determiner 403 determines whether the detected reference instruction coincides with the input and output condition described in the specification information or not (step S503).

When it is determined at step S503 that the detected reference instruction does not coincide with the input and output condition (step S503: No), the outputter 504 outputs an error signal (step S504) and the series of processing is ended. On the other hand, when it is determined at step S503 that the detected reference instruction coincides with the input and output condition (step S503: Yes), it is determined whether the reference instruction simulation is finished or not (step S505).

When it is determined at step S505 that the simulation of the reference instruction is not finished (step S505: No), the process returns to step S502 and the detection of the reference instruction is continuously performed. On the other hand, when it is determined at step S505 that the simulation of the reference instruction is finished (step S505: Yes), the series of processing is ended under that condition.

As described above, the instruction check program 121 executed by the instruction check apparatus 120 is capable of checking whether an incorrect reference instruction that places a load on the microcomputer 111 is carried out or not when the simulation by the I/O simulator 110 is executed. Hereinafter, first to third examples will be described in which an LSI including a ROM, a RAM, and an I/O area executes an I/O simulation including the above-described instruction check processing.

First, the instruction check procedure of a first example will be described. In the first example, which is a basic instruction check processing, when it is determined that the processing is incorrect, the user is notified of this error.

Figure 6:
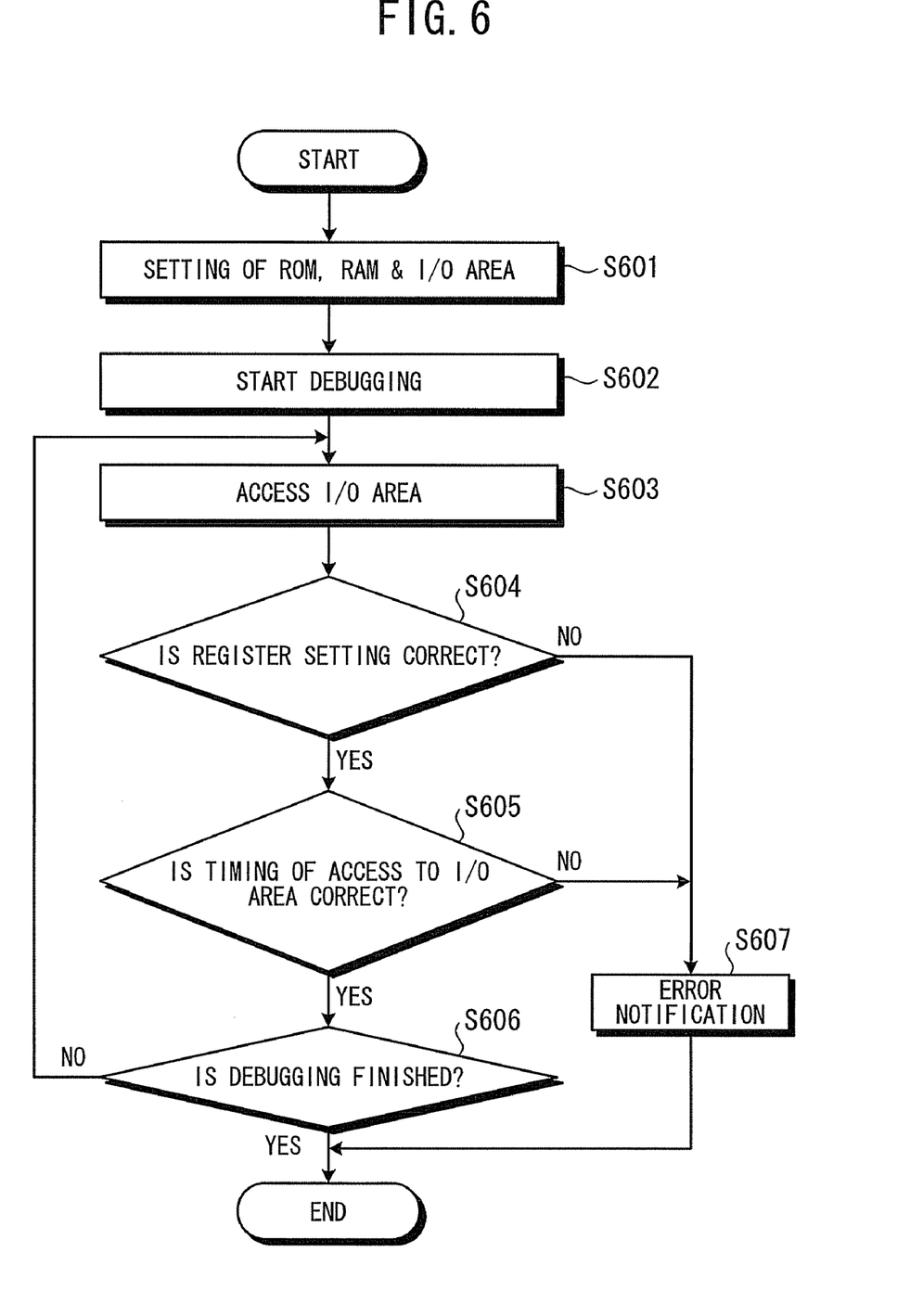
FIG. 6 is a flowchart showing the instruction check procedure of a first example.

FIG. 6 is a flowchart showing the instruction check procedure of the first example. In the flowchart of FIG. 6, first, the setting of the RAM, ROM, and I/O area is made (step S601), and debugging is started by a simulation of the LSI (step S602).

When debugging is started at step S602, the I/O area is accessed (step S603). It is determined whether the register setting is correct or not (step S604). When it is determined that the register setting is correct (step S604: Yes), it is then determined whether the timing of access to the I/O area is correct or not (step S605). When it is determined at step S605 that the timing of access to the I/O area is correct (step S605: Yes), it is determined whether debugging is finished under that condition or not (step S606). Then, the process returns to step S603 to continuously perform the debugging processing until debugging is finished, and the I/O area is accessed (step S606: loop of No).

On the other hand, when it is determined at step S604 that the register setting is incorrect (step S604: No), or when it is determined at step S605 that the timing of access to the I/O area is incorrect (step S605: No), since incorrect processing was performed, error notification is provided (step S607), and the series of processing is ended. When it is not determined at steps S604 and S605 that incorrect processing was performed (steps S604 and S605: Yes), the series of processing is ended under that condition when debugging is finished (step S606: Yes).

As described above, in the first example, when it is determined that either of the register setting at the time of access to the I/O area or the access timing is incorrect, error notification is provided to the user. Since the debugging processing is stopped by the error notification, the user can determine which instruction is the cause of the error.

Next, a second example will be described. In the second example, as in the first example, when it is determined that incorrect processing was performed, error notification is provided, and further, the erroneous part is automatically corrected.

Figure 7:
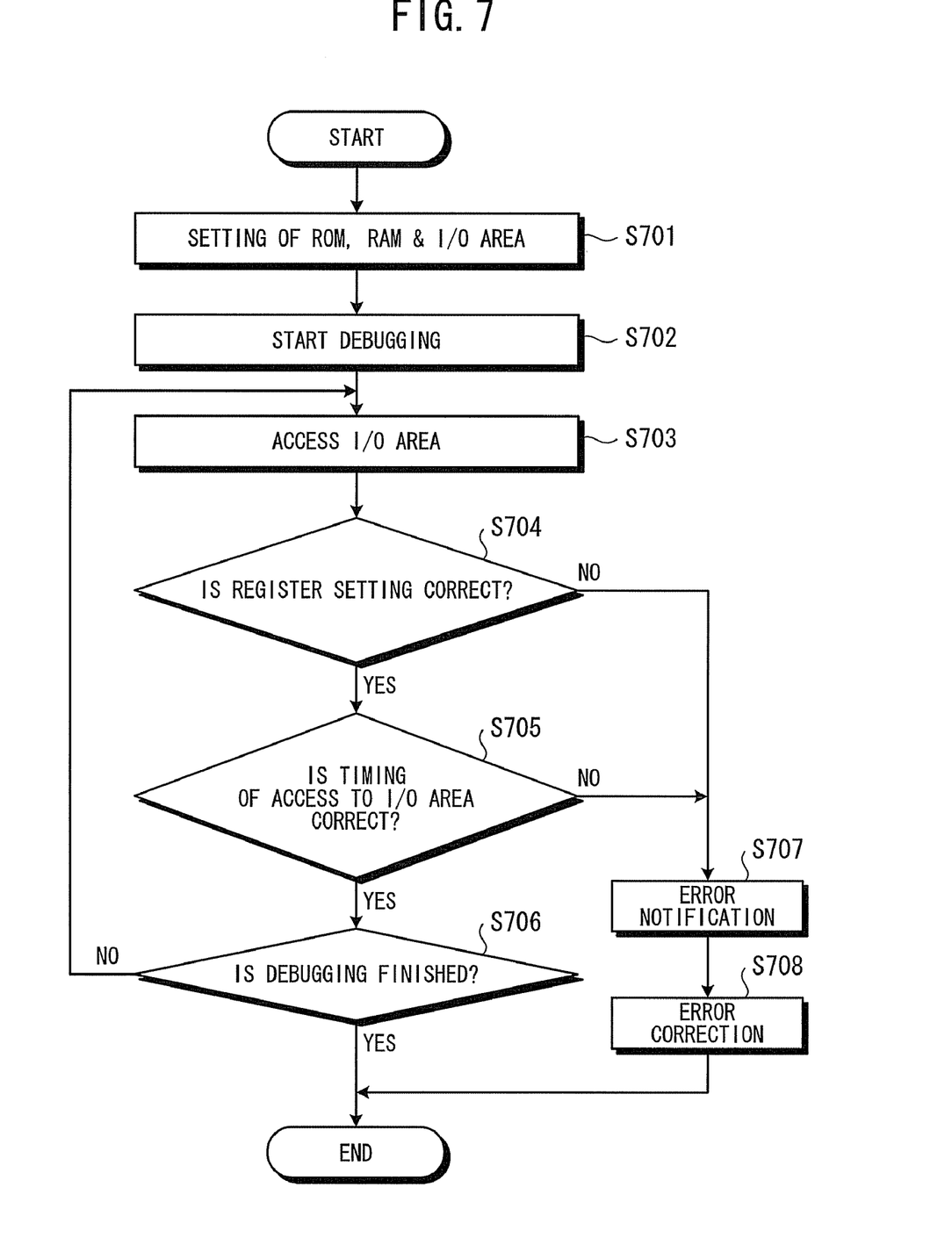
FIG. 7 is a flowchart showing the instruction check procedure of a second example.

FIG. 7 is a flowchart showing the instruction check procedure of the second example. In the flowchart of FIG. 7, as the processing from the setting of the RAM, ROM, and I/O area (step S701) to the determination of finish of debugging (step S706), processing similar to that of the first example described with reference to FIG. 6 is performed.

In the second example, when it is determined at step S704 that the register setting is incorrect (step S704: No) or when it is determined at step S705 that the timing of access to the I/O area is incorrect (step S705: No), since incorrect processing was performed, error notification is provided as in the first example (step S707), and further, the error is corrected (step S708). Then, the series of processing is ended.

Figure 8:
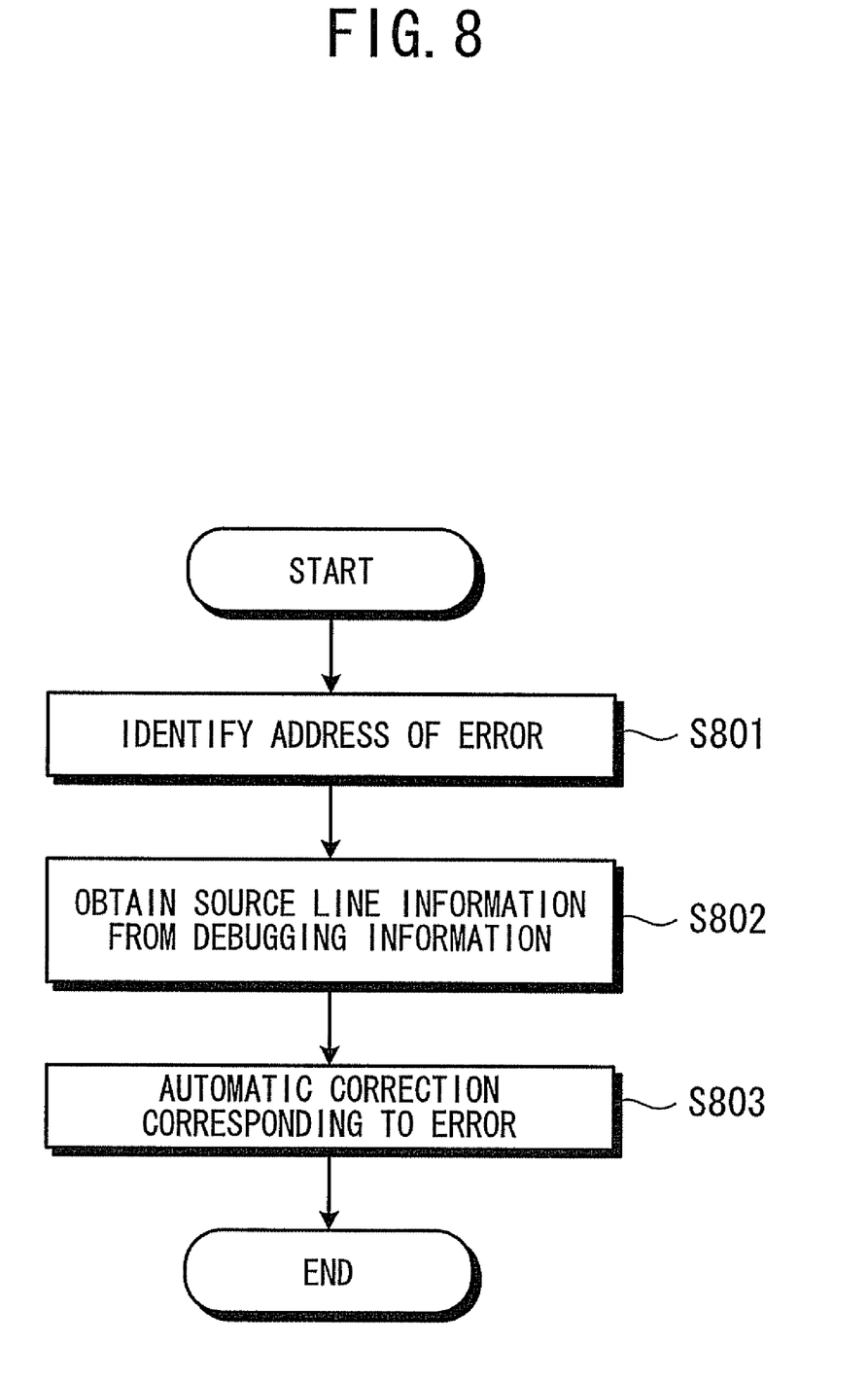
FIG. 8 is a flowchart showing the procedure of error correction processing.
Figure 9:
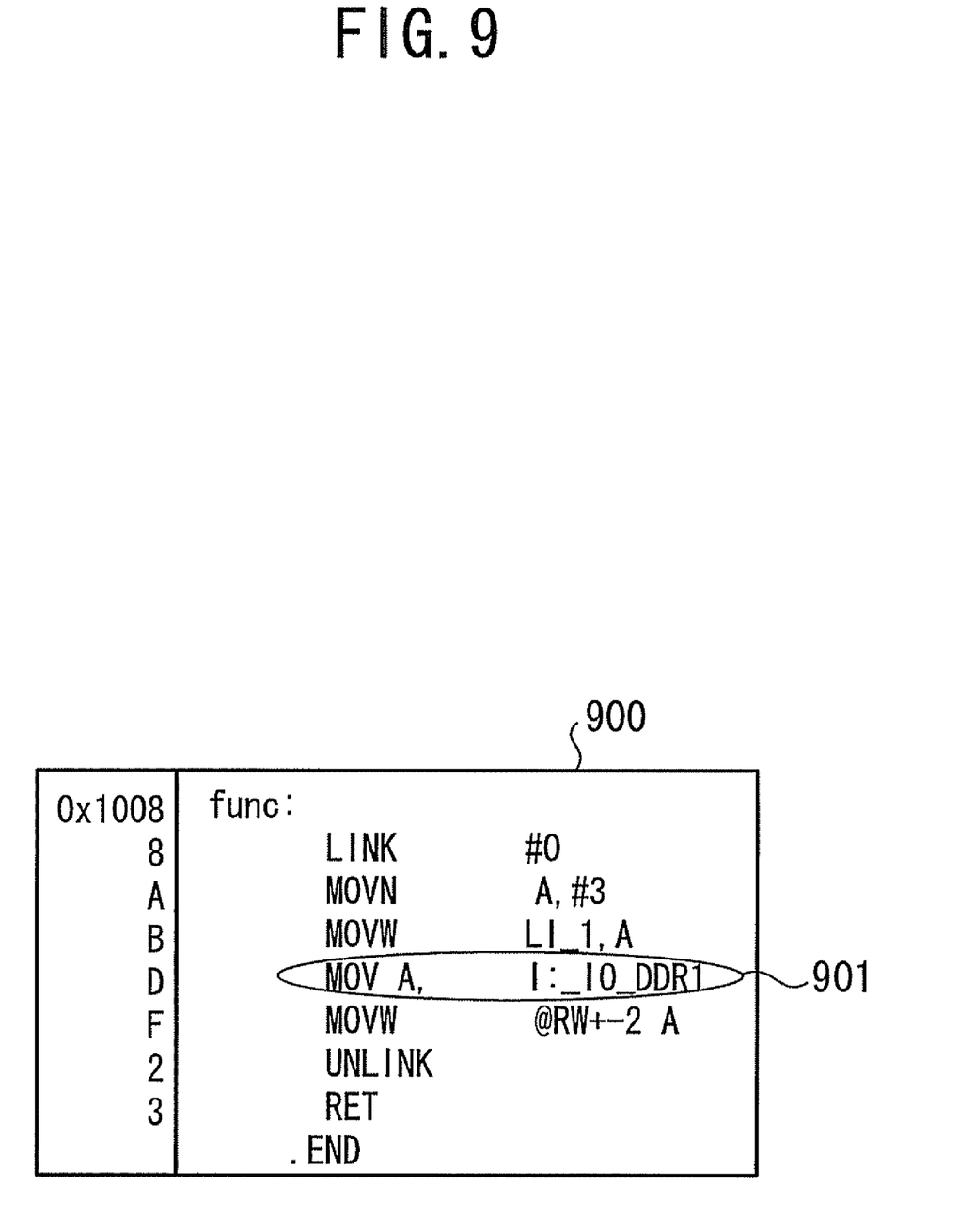
FIG. 9 shows a source code as an example of an error program.

Now, the concrete contents of the error correction processing executed by step S708 will be described. FIG. 8 is a flowchart showing the procedure of the error correction processing. FIG. 9 shows a source code as an example of an error program. In the flowchart of FIG. 8, first, the address of the error is identified (step S801). In this description, as an example, it is assumed that an error occurs at an address [0x100D] of a source code 900 shown in FIG. 9. Therefore, the information on the source line where the error occurs is obtained from the debugging information (step S802). That is, func:MOVA, I:_IO_DDR1(901) of the source line at the address [0x100D] is obtained. Automatic correction corresponding to the error is performed on the information obtained by step S802 (step S803) and the series of error correction processing is ended. By the automatic correction, a correction code such as #pragma is inserted at the address [0x100D].

As described above, in the second example, the error part can be automatically corrected by obtaining the information on the source line of the part where the processing either the register setting at the time of access to the I/O area or the access timing of which is determined to be incorrect is executed. While in the flowchart of FIG. 7, the error the notification of which is provided is corrected (step S708) after error notification is provided (step S707), a structure may be adopted in which only correction processing is performed with no error notification provided.

Lastly, a third example will be described. In the third example, a different error message is provided according to the specification information of the LSI that is executing I/O debugging.

Figure 10:
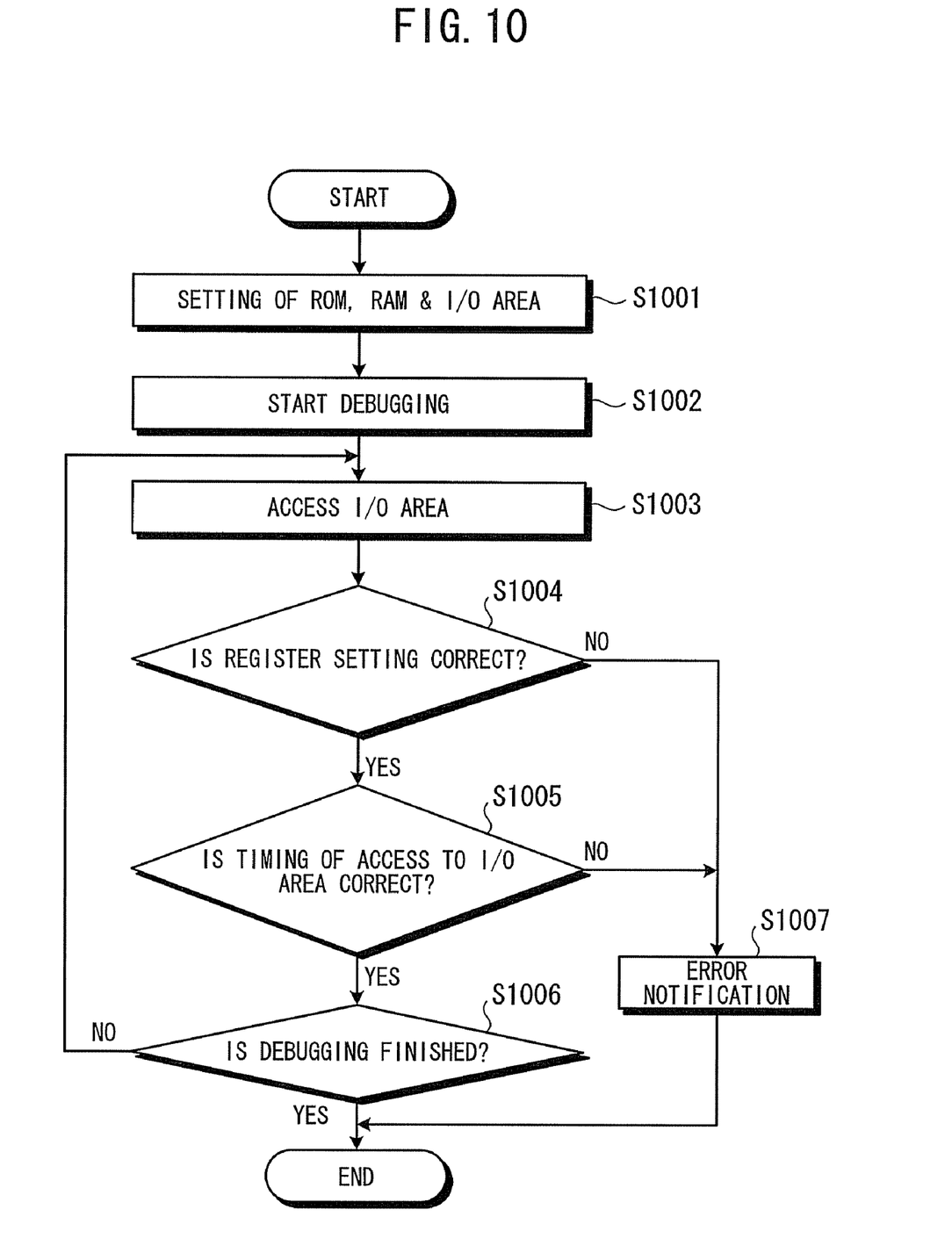
FIG. 10 is a flowchart showing the instruction check procedure of a third example.

FIG. 10 is a flowchart showing the instruction check procedure of the third example. In the flowchart of FIG. 10, as the processing from the setting of the RAM, ROM, and I/O area (step S1001) to the determination of finish of debugging (step S1006), processing similar to that of the first example described with reference to FIG. 6 is performed. When it is determined that the register setting is incorrect at step S1004 (step S1004: No) or when it is determined that the timing of access to the I/O area is incorrect (step S1005: No), error notification is provided as in the first example (step S1007).

In the case of the third example, when error notification is provided at step S1007, error notification can be provided that corresponds to the specification information of the LSI that is currently performing I/O simulation. Hereinafter, the output format of the error message and the kind of the error message will be described with respect to concrete examples.

In the third example, the error message is outputted in the following format: "***file name(line number)XnnnnK:message text"·file name(line number):name of the source file where the error occurs, source line number·X:alphanumerics representing the level of the error (e.g. E: error)·nnnn:error number·K:tool type (e.g. K: I/O simulation add-in)·message text:body of the message and additional information The additional information included in the message is the register name and the bit name. Concrete examples thereof include a case where only the register name is outputted (XXX), a case where the register name and the bit name are outputted (XXX:YYY), and a case where a plurality of registers are outputted (XXX:YYY&XXX:YYY) (XXX represents the register name, and YYY represents the bit name).

Therefore, when "***sample.c(234)E4001K:A setting inhibited value is written to the reserved bit . . . (PSCCR)" is outputted as the error message, this indicates that an error corresponding to the error number E4001K occurs while the file with a file name of "sample.c(234)" is being executed. It is apparent that this error message includes the register name "PSCCR" as the additional information.

Next, the error message type will be described. Since the error message type differs according to which part of the I/O area the simulation being executed by the I/O simulator 110 is, some concrete examples of the type are shown in the following:

Type 1: Reserved Bit Access Violation

An error message outputted when a value inhibited by the hardware manual (specification) is written to the reserved bit of the I/O register. An error number "E4001K" is outputted, and a message providing notification of access violation such as "A setting inhibited value is written to the reversed bit" is displayed.

Type 2: I/O Register Set Value Violation

An error message outputted when a value inhibited by the hardware manual (specifications) is written to the I/O register. An error number "E4002K" is outputted, and a message providing notification of access violation such as "A setting inhibited value is written to the register" is displayed.

Type 3: Unsupported Function Warning

An error message outputted when the function of the I/O resource selected by the value set to the I/O register is not supported by the I/O simulator 110. An error number "E4021K" is outputted, and a message providing notification of unsupported function warning such as "The set value is not supported by the simulator . . . " is displayed.

Figure 11:
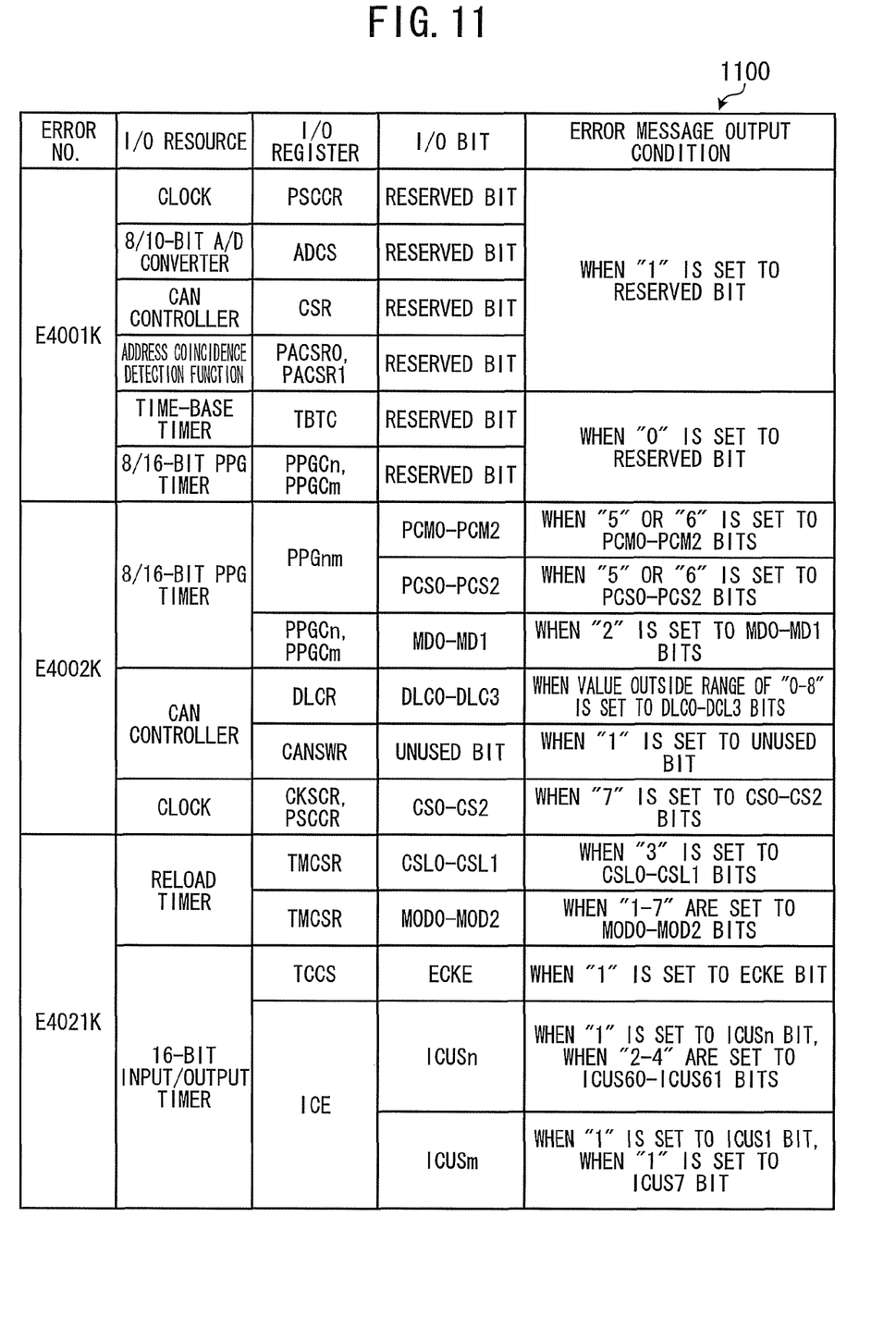
FIG. 11 is a table showing error message examples.

FIG. 11 is a table showing error message examples. A table like the table 1100 is stored in the instruction check program 121. When an error message is outputted, the most suitable error message is selected and outputted according to the contents of the error number, I/O resource, I/O register, and I/O bit.

As described above, in the third example, when an incorrect processing is detected, the most suitable error message can be provided according to the specification information of the LSI that is executing I/O debugging in order that the user can identify the cause of the incorrect processing.

As in the above-described first to third examples, by using the I/O simulator 110 including the instruction check processing before performing the debugging processing by the actual apparatus, incorrect hardware access can be detected. By making the correction reflected in the compiler or the assembler so that the instruction sequence is correct by using the detection of the incorrect hardware access, the program can be corrected in an early stage without hindrance to the hardware environment.

Conventionally, to determine whether correct register setting for using the I/O resource is made or not, it is necessary to refer to the specification of the LSI, and the determination cannot be made merely by analyzing the I/O access information. However, in the case of the present embodiment, by referring to the error notification, it can be easily identified concretely which processing causes the error.

As described above, according to the present embodiment, the correctness of access to hardware resources can be checked in the simulation of the I/O area in the I/O simulator. Moreover, as in the present embodiment, in addition to when the I/O simulator 110 is used as the pre-stage processing for mounting on an actual apparatus, when it is examined whether to replace the microcomputer already mounted on an actual apparatus with another one, evaluation of the case where the another microcomputer is mounted can be previously made.

The instruction check method described in the present embodiment can be implemented by executing a prepared program by a computer such as a personal computer or a workstation. This program is executed by being recorded on a computer-readable recording medium such as a hard disk, a flexible disk, a CD-ROM, an MO, or a DVD and being read from the recording medium by the computer. This program may be a transmission medium capable of being distributed through a network such as the Internet.

The I/O simulator 110 described in the present embodiment can also be implemented by an application specific integrated circuit (hereinafter, referred merely to "ASIC") such as a standard cell or a structured ASIC, or a programmable logic device (hereinafter, referred merely to "PLD") such as an FPGA. Specifically, for example, function definition of the above-described I/O simulator 110 function and the instruction check processor 400 is performed by an HDL description, logic synthesis of the HDL description is performed, and the result is supplied to the ASIC and the PLD, whereby the I/O simulator 110 including the instruction check processing function can be manufactured.

What is claimed is:

1. A non-transitory computer-readable medium encoded with an instruction check program for making a computer to check a status of execution of an instruction by an I/O simulator that performs an operation simulation according to a structure of an I/O area of a microcomputer, the instruction check program when executed by a computer causes the computer to perform a method comprising:
    obtaining specification information of the microcomputer describing an input and an output condition of a hardware resource in the I/O area;
    detecting a simulation of a reference instruction to the hardware resource executed by the I/O simulator;
    determining correctness of the reference instruction by comparing a content of the simulation of the reference instruction detected by the detecting with the input and output condition of the hardware resource included in the obtained specification information; and
    wherein it is determined that the reference instruction is correct when an address of the hardware resource referred to in the simulation detected by the detecting coincides with an address described in the input and output condition of the hardware resource and when a timing of access to the hardware resource coincides with the input and output condition.

2. The computer-readable medium according to claim 1, wherein the instruction check program causes the computer to further perform outputting an error message providing a notification of incorrect timing of access to the hardware resource when it is determined that the reference instruction is incorrect.

3. The computer-readable medium according to claim 1, wherein the instruction check program causes the computer to further perform
    inserting, into the reference instruction, a correction code to execute reference to correct hardware when it is determined that the reference instruction is incorrect.

4. An instruction check apparatus that checks a status of execution of an instruction by an I/O simulator that performs an operation simulation according to a structure of an I/O area of a microcomputer, the apparatus comprising:
    a unit obtaining specification information of the microcomputer describing an input and an output condition of a hardware resource in the I/O area;
    a unit detecting a simulation of a reference instruction to the hardware resource executed by the I/O simulator;
    a unit determining correctness of the reference instruction by comparing a content of the simulation of the reference instruction detected by the detecting unit with the input and output condition of the hardware resource included in the specification information obtained by the obtaining unit; and
    a unit outputting an error signal when the determining unit determines that the reference instruction is incorrect,
    wherein the determining unit determines that the reference instruction is correct when an address of the hardware resource referred to in the simulation detected by the detecting unit coincides with an address described in the input and output condition of the hardware resource and when a timing of access to the hardware, resource coincides with the input and output condition.

5. The instruction check apparatus according to claim 4, wherein the outputting unit outputs an error message providing notification of incorrect timing of access to the hardware resource when the determining unit determines that the reference instruction is incorrect.

6. The instruction check apparatus according to claim 4, further comprising a unit inserting, into the reference instruction, a correction code to execute reference to correct hardware when the determining unit determines that that the reference instruction is incorrect.

7. An I/O simulator that performs an operation simulation according to a structure of an I/O area of a microcomputer, the I/O simulator comprising:
    a unit obtaining specification information of the microcomputer describing an input and an output condition of a hardware resource in the I/O area;
    a unit detecting a simulation of a reference instruction to the hardware resource executed by the I/O simulator;
    a unit determining correctness of the reference instruction by comparing a content of the simulation of the reference instruction detected by the detecting unit with the input and output condition of the hardware resource included in the specification information obtained by the obtaining unit; and
    a unit outputting an error signal when the determining unit determines that the reference instruction is incorrect,
    wherein the determining unit determines that the reference instruction is correct when an address of the hardware resource referred to in the simulation detected by the detecting unit coincides with an address described in the input and output condition of the hardware resource and when a timing of access to the hardware resource coincides with the input and output condition.

8. The I/O simulator according to claim 7, wherein the outputting unit outputs an error message providing notification of incorrect timing of access to the hardware resource when the determining unit determines that the reference instruction is incorrect.

9. The I/O. simulator according to claim 7, further comprising further comprising a unit inserting, into the reference instruction, a correction code to execute reference to correct hardware when the determining unit determines that that the reference instruction is incorrect.

* * * * *

UNITED STATES PATENT AND TRADEMARK OFFICE
CERTIFICATE OF CORRECTION

| | |
|---|---|
| PATENT NO. | : 8,332,204 B2 |
| APPLICATION NO. | : 12/343767 |
| DATED | : December 11, 2012 |
| INVENTOR(S) | : Manabu Watanabe |

It is certified that error appears in the above-identified patent and that said Letters Patent is hereby corrected as shown below:

Column 10, Line 29, In Claim 6, delete "that that" and insert -- that --, therefor.
Column 10, Line 59, In Claim 9, delete "I/O." and insert -- I/O --, therefor.
Column 10, Line 60, In Claim 9, before "a unit" delete "further comprising".
Column 10, Line 62, In Claim 9, delete "that that" and insert -- that --, therefor.

Signed and Sealed this
Fifth Day of March, 2013

Teresa Stanek Rea
*Acting Director of the United States Patent and Trademark Office*